Figures 1, 2:
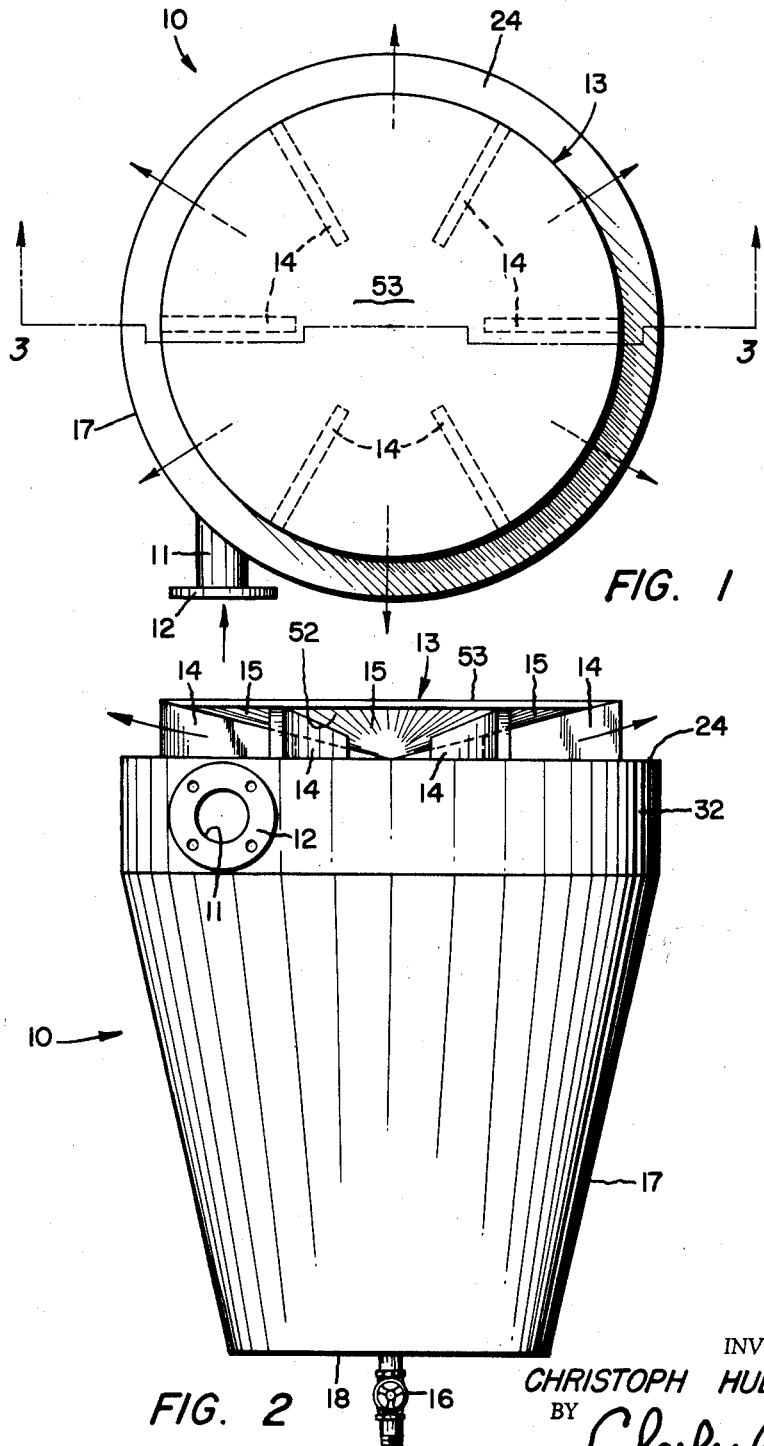

April 28, 1964

C. HUBRICH 3,130,812

SILENCERS

Filed Jan. 17, 1963

3 Sheets-Sheet 1

INVENTOR.
CHRISTOPH HUBRICH
BY Charles J. Worth
AGENT

April 28, 1964 — C. HUBRICH — 3,130,812
SILENCERS
Filed Jan. 17, 1963 — 3 Sheets-Sheet 2
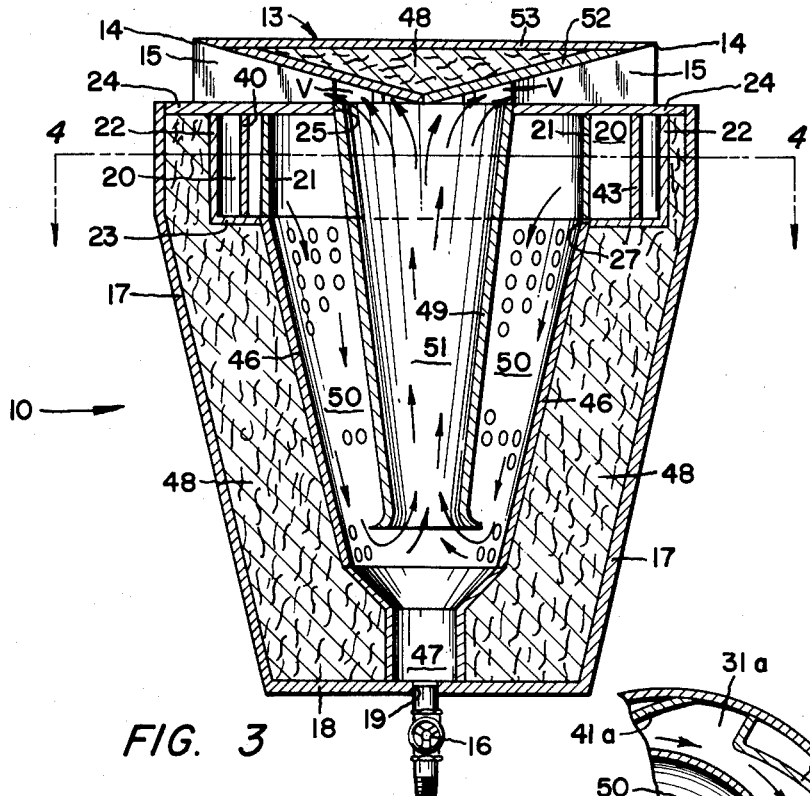
FIG. 3
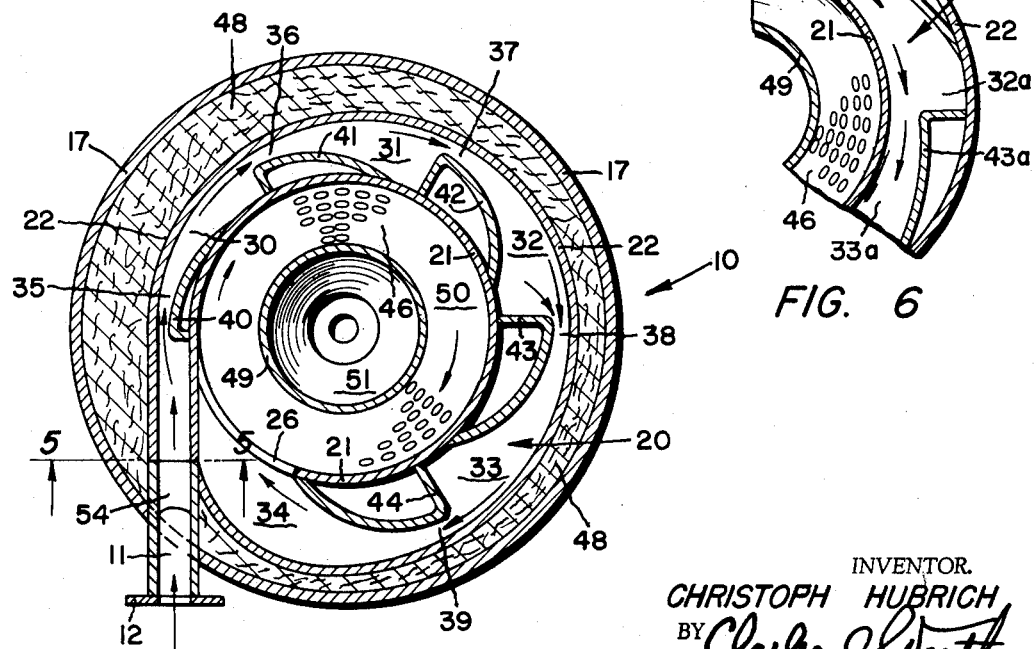
FIG. 4
FIG. 6
INVENTOR.
CHRISTOPH HUBRICH
BY Charles J. Worth
AGENT April 28, 1964 C. HUBRICH 3,130,812
SILENCERS
Filed Jan. 17, 1963 3 Sheets-Sheet 3

INVENTOR.
CHRISTOPH HUBRICH
BY Charles J. Worth
AGENT

United States Patent Office 3,130,812
Patented Apr. 28, 1964

3,130,812
SILENCERS
Christoph Hubrich, Seligenstradter Strasse 36,
Offenbach am Main, Bieber, Germany
Filed Jan. 17, 1963, Ser. No. 252,224
8 Claims. (Cl. 181—53)

This invention relates to wave abatement or damping devices and more particularly to silencers or mufflers for absorbing vibration or noise associated with high velocity flow of pressure fluid.

The present application is a continuation-in-part of my copending U.S. application, Serial Number 845,060, filed October 6, 1959.

A primary problem associated with high velocity pressure fluid discharge is sound or vibration reduction of such discharging vapors and gases. An efficient solution of this problem is possible if critical combined flow velocity and pressure can be prevented or alleviated. To achieve this, a damping device may be provided, however, with relatively high pressures at the silencer inlet a plurality of expansion stages are required in a predetermined series. Following such expansion stages, which are of a size determined by flow capacities, rates, and pressures encountered, efficient absorption-damping means is provided that is supported by resonance chambers for main flow frequencies to attenuate high noise levels associated with high velocity flow. When such high velocities are encountered, efficient expansion-damping apparatus presently in use is excessively large and expensive. Other relatively small devices have been tried with only limited effectiveness.

The present invention solves the problem of efficient attenuation by employing cyclonic flow in a wave abatement device combined with a plurality of expansion stages accommodated in a relatively limited area. The centrifugal force of such cyclonic flow maintains the wave carrier pressure fluid in intimate contact with a sound absorbing wall, which greatly amplifies damping to provide the desired efficient device.

An object of this invention is to provide effective compact means to absorb sound or vibration associated with high velocity pressure fluid flow.

Another object of this invention is to provide a sound or vibration attenuator for flow of pressure fluid that utilizes a cyclonic flow between a predetermined series of expansion stages and final attenuation.

Still, another object of this invention is to provide retroverted flow during final attenuation of the above attenuator to provide compact construction.

And another object of this invention is to provide the above device in which the series of expansion stages are disposed in a circular path.

This invention contemplates silencer for pressure fluid flow, comprising a casing having an annular expansion chamber at one end with an inlet to receive pressure fluid, an elongated expansion chamber communicating at one end with the annular chamber and extending toward the other end of the casing, and a wall at the other end of the casing closing the end of the elongated chamber thereat; and a tubular member disposed in the elongated chamber having one end spaced from the end wall to receive pressure fluid and its other end extending through the annular chamber to provide a discharge for fluid outward of said casing.

The foregoing and other objects and advantages will appear more fully hereinafter from a consideration of the detailed description which follows, taken together with the accompanying drawings wherein several embodiments of the invention are illustrated by way of example. It is expressly understood, however, that the drawings are for illustration purposes only and are not to be construed as defining the limits of the invention.

Figure 5:
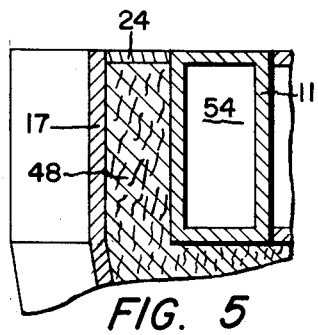
Figure 7:
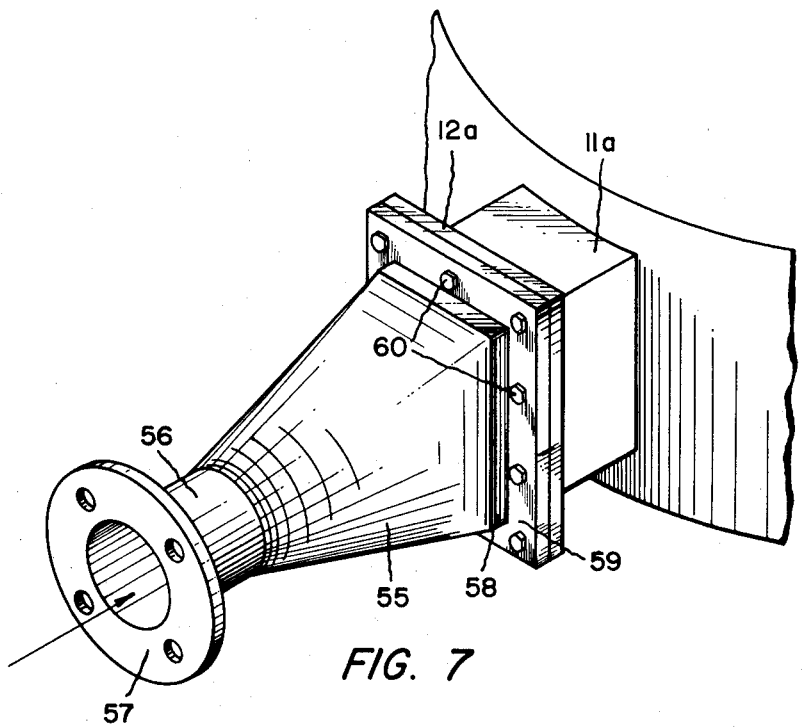

FIGURE 1 is an elevational view of a wave damping device made in accordance with the invention,
FIGURE 2 is a plan view of the novel device of FIGURE 1,
FIGURE 3 is a sectional view taken on line 3—3 of FIGURE 1,
FIGURE 4 is a sectional view taken on line 4—4 of FIGURE 3,
FIGURE 5 is an enlarged sectional view taken on line 5—5 of FIGURE 4 further illustrating a novel inlet area,
FIGURE 6 is a fragmentary sectional view similar to a portion of FIGURE 4 illustrating a modified annular chamber, and
FIGURE 7 is a perspective view of a modified novel inlet area.

Now referring to the drawings, specifically FIGURES 1 and 2, a silencer or sound abatement device 10, made in accordance with the invention, is substantially cylindrical and has an inlet 11 adjacent one end to receive pressure fluid to be muffled. A flange 12 encircles inlet 11 and provides means for connecting silencer 10 to a discharge pipe (not shown). An end cap 13 is connected to and in spaced relation with the inlet end of silencer 10 by a series of radially disposed, arcuately spaced vanes 14 to provide a discharge path 15, which is zoned by such vanes. It should be understood that while vanes 14 are preferable, any conventional spacer means for mounting an end cap to a substantially tubular body may be used within the spirit and scope of this invention. The silencer 10 is preferably positioned for use as shown in the drawings with its end opposite from end cap 13 forming a closed bottom, except for a drain valve 16, which will be further discussed.

Considering now the specific structure contemplated, silencer 10 has an outer tubular casing 17 of substantially constant diameter at the top portion thereof, and tapering toward the bottom. The bottom of casing 17 is closed by a bottom end wall 18 having a central opening 19 for drain valve 16. An annular chamber or flow passage 20 is disposed in the end of the silencer 10 supporting the end cap 13, or its top end, and is defined by a circular inner wall 21 concentric with casing 17 and a circular outer wall 22 eccentrically disposed relative to casing 17 and inner wall 21. The bottom of the annular chamber 20 is closed by a wall 23 while the top of the chamber 20 is closed by a top end wall 24, of casing 17, having a central opening 25 which will be further discussed.

Inlet 11 tangentially intersects the narrowest portion of annular chamber 20, when measured radially from the center of the silencer 10, and its wall forms a downstream block to prevent continuous circular flow in chamber 20. Inner wall 21 has an opening 26 adjacent the wall of inlet 11, at the downstream end of chamber 20 which is the outlet for such chamber.

Annular chamber 20 is comprised of a series of spaced expansion pockets 30, 31, 32, 33, and 34, from inlet 11 to outlet 26, which progressively increase in area, and are disposed downstream from restricted inlets 35, 36, 37, 38, and 39, respectively, formed by respective wall portions 40, 41, 42, 43, and 44. Although wall portions 40 to 44 are shown in FIGURES 3 and 4 as separate wall pieces connected to inner wall 21, it should be understood that inner wall 21 and protruding wall portions 40 to 44 may be of unitary construction.

The bottom wall 23 of annular chamber 20 has a central opening 27 coincident with inner annular wall 21. A perforated tapered tube or cyclone mantle 46 is connected at its upper end to bottom wall 23 and inner wall 21 of chamber 20, and extends toward the closed bottom end of the casing 17. The bottom end of cyclone mantle 46, reduced in size to form a catcher or sump 47, is connected to bottom end wall 18. Perforated cyclone mantle 46 is substantially concentric with and spaced from casing 17 providing an annular area therebetween, continuous with an annular area between outer wall 22 and casing 17, that is filled with a sound and/or vibration damping material 48.

A tapered middle tube 49 is wider at its top end which is connected to top end wall 24, within opening 25, and extends toward bottom end wall 18. Middle tube 49 is concentric with and in spaced relation to cyclone mantle 46 forming an annular cyclone chamber 50. The bottom end of middle tube 49 is spaced from end wall 18 to provide an inlet from annular cyclone chamber 50 to an expanding chamber 51 defined within the middle tube. The connected top end of middle tube 49 preferably terminates flush with top end wall 24 and communicates with discharge 15 formed between end cap 13 and such end wall 24.

End cap 13 preferably has a conical inner wall 52 and a flat outer wall 53 providing a space for sound and/or vibration absorbing material 48. With end cap 13 as described, discharge 15 of silencer 10 increases in area radially outwardly from middle tube 49.

Silencer 10, constructed as above, receives pressure fluid at inlet 11 which tangentially enters annular chamber 20 and traverses a circular path of a series of expansion steps provided by expansion pockets or chambers 30 to 34 with restricted inlets 35 to 39, respectively, as previously described. Partially damped pressure fluid leaves the terminal expansion chamber 34 through outlet opening 26 in wall 21 and courses a helical path in the annular cyclone chamber 50 formed by cyclone mantle 46 and middle tube 49. At the bottom of cyclone chamber 50, the flow of pressure fluid reverses direction or its retroverted and travels upwardly in expansion chamber 51 in middle tube 49 to silencer discharge 15.

The tangential inlet 11 may provide a preliminary or first stage expansion chamber 54 having a circular cross-section at its inlet end with flange 12 and a rectangular cross-section at its downstream end that corresponds generally to the cross-section of annular chamber 20, as shown in FIGURE 5. Thus, the length of the inlet 11 from flange 12 to annular chamber 20 provides an enlarging transition area 54 which permits expansion of the pressure fluid received.

The arrangement of inlet 11 may be modified as shown in FIGURE 7, wherein an inlet 11a is of rectangular cross-section along its full length and has a rectangular flange 12a. A transition pipe 55 is now of circular cross-section at its upstream end 56 and has a circular flange 57 for connection to an exhaust line (not shown). The downstream end 58 of pipe 55 is of rectangular cross-section and has a rectangular flange 59 connected to rectangular flange 12a of modified inlet 11a by a series of bolts or fasteners 60. In this modified arrangement, the inlet 11a is of a substantially constant cross-section and substantially corresponds to the cross-section of annular chamber 20. Pipe section 55 now provides a transition chamber for primary expansion.

Annular chamber 20 may be modified as shown, in part, in FIGURE 6. Specifically, the modified chamber 20a as shown has wall portions 41a, 42a, and 43a corresponding to portions 41, 42, and 43, respectively, are connected to or integral with outer wall 22, and form expansion chambers or pockets 31a, 32a, and 33a, corresponding to pockets 31, 32, and 33 of FIGURE 4.

It should be readily understood from the foregoing, pressure fluid to be muffled, discharged into the silencer courses a circular path in chamber 20 or 20a, a spiral path in cyclone chamber 50, and a retroverted axial path in chamber 51 of middle tube 49. The expansion pockets 30 to 34 with their restricted inlets 35 to 39, respectively, act as attenuation chambers progressively retarding the rate of flow of pressure fluid. The pressure fluid then leaving annular chamber or passage 20 through opening 26 in wall 21, courses a spiral flow path to the bottom of cyclone chamber 50 during which time the fluid further expands and is subject to centrifugal forces. Final damping is derived during retroverted axial flow in chamber 51.

Sound and/or vibration, when charted, indicates peak force amplitude which transcribes a generally sinusoidal wave of alternate peaks and valleys (negative peaks) disposed on a zero axis, wherein the peak force acts transverse to the axis of flow. When visualized in association with flow in annular cyclone chamber 50, centrifugal force amplifies pressure fluid force pulses buffeting cyclone mantle 46, such pulses then reversing in direction to impinge on middle tube 49, thus alternating back and forth across the zero axis as the carrier fluid courses the full axial extent of chamber 50.

It should be realized, however, that as such pressure fluid carriers expand, the carried wave length increases and its intensity or amplitude decreases tending to flatten the wave form. When the carrier fluid with a flattened wave, indicative of force, is in the cyclone chamber 50, the fluid is subject to centrifugal force which tends to distort or shift the wave relative to the zero axis or toward the side of the axis considered as being toward the cyclone mantle 46. Thus, the peaks increase in amplitude and the valleys or negative peaks decrease in amplitude to become relatively strengthening force pulses toward mantle 46 and weakening force pulses toward middle tube 49. The cyclone mantle 46, being perforated, is backed by damping material 48 which absorbs pulse energy to reduce the intensity of the wave peaks while centrifugal force reduces the intensity of the negative wave peaks. Combining wave extension due to expansion together with depression of the wave form, reduced amplitude is derived and the wave at the end of cyclone chamber 50 is severely damped.

Such severely damped fluid is retroverted or reverses its direction of travel and passes through chamber 51 or the last expansion stage provided by middle tube 49 in which substantially total attenuation is derived, and sound or vibration waves initially carried by the fluid exhausting from middle tube 49 to discharge 15 is substantially zero, the minor wave if any remains, being attenuated by impingement of the fluid onto the end cap 15 which is filled with vibration absorbing material 48.

By providing the circular flow in chamber 20 with the progressively increasing attentuation or expansion pockets 30 to 34 in one end of the silencer 10 together with retroversed axial flow, expansion in chamber 51 of middle tube 49, connected by intermediate spiral flow with expansion and attenuation derived by reaction of centrifugal force and the absorbent material 48, an effective silencer is provided for elimination of sound and/or vibration waves and harmonics thereof carried by a pressure fluid which is highly effective and is much smaller in size than comparable silencer devices with equivalent efficiency. The sump or catcher 47 and the drain valve 16 are merely provided to release trapped liquids which may accumulate during use of silencer 10.

Having thus described preferred embodiments of the invention, I claim:

1. A silencer for pressure fluid flow, comprising:
   (a) a casing having an annular expansion chamber of series connected progressively enlarging expansion pockets disposed at one end with an inlet to receive pressure fluid, an elongated expansion chamber communicating at one end with the annular chamber and extending toward the other end of the casing, and a wall at the other end of the casing closing the end of the elongated chamber thereat;
   (b) and a tubular member disposed in the elongated chamber having one end spaced from the end wall to receive pressure fluid and its other end extending through the annular chamber to provide a discharge for fluid outward of said casing.

2. A silencer for pressure fluid flow, comprising:
(a) a casing having an annular expansion chamber at one end with an inlet to receive pressure fluid, an elongated expansion chamber communicating at one end with the annular chamber and extending toward the other end of the casing, and a wall at the other end of the casing closing the end of the elongated chamber thereat;
(b) a tubular member disposed in the elongated chamber having one end spaced from the end wall to receive pressure fluid and its other end extending through the annular chamber;
(c) and a cap supported at the end of said casing adjacent the annular chamber and spaced from the end of the tubular member to form with such tubular member end an annular opening for discharge of fluid.

3. A silencer for pressure fluid flow, comprising:
(a) a casing having an annular expansion chamber of rectangular cross-section disposed on one end thereof, an elongated expansion chamber communicating at one end with the annular chamber and extending toward the other end of the casing, and a wall at the other end of the casing closing the end of the elongated chamber thereat;
(b) a tubular member disposed in the elongated chamber having one end spaced from the end wall to receive pressure fluid and its other end extending through the annular chamber;
(c) a cap supported at the end of said casing adjacent the annular chamber and spaced from the end of the tubular member to form with such tubular member end an annular opening for discharge of fluid;
(d) and a pipe to receive pressure fluid flow connected to said casing and communicating with the annular expansion chamber, said pipe being of rectangular cross-section at the end connected to the casing, and graduating to circular cross-section at its other end to provide a first expansion chamber.

4. A silencer for pressure fluid flow, comprising:
(a) a casing having a plurality of series connected expansion pockets disposed in one end thereof progressively enlarging and forming an annular chamber of rectangular cross-section, an elongated expansion chamber communicating at one end with the last of the series of pockets and tapering toward the other end of the casing, and a wall at the other end of the casing closing the end of the elongated chamber thereat;
(b) a tapered tubular member disposed in the elongated chamber having its smaller end spaced from the end wall to receive pressure fluid and its other end extending through the annular chamber;
(c) a cap supported at the end of said casing adjacent the annular chamber and spaced from the end of the tubular member to form with such tubular member end an annular opening for discharge of fluid;
(d) and a pipe to receive pressure fluid flow connected to said casing and communicating with the first of the series of pockets, said pipe being of rectangular cross-section at the end connected to the casing and graduating to circular cross-section at its other end to provide a first expansion chamber.

5. A silencer for pressure fluid flow, comprising:
(a) a casing having an inlet at one end to receive pressure fluid and a wall at its other end,
(b) wall means disposed in the inlet end of the casing to provide an annular resonance damping chamber communicating with the casing inlet,
(c) a perforated cyclone mantle disposed in the casing to provide an expansion chamber communicating at one end with the annular chamber and being closed at its other end by the casing end wall,
(d) sound absorbing material encircling the mantle,
(e) and a tubular member disposed in spaced relationship in the mantle to provide another expansion chamber, the tubular member having one end spaced from the casing end wall for receiving fluid and its other end extending through the annular wall means for discharging such fluid.

6. A silencer for pressure fluid flow, comprising:
(a) a casing having an inlet at one end to receive pressure fluid and a wall at its other end,
(b) wall means disposed in the inlet end of the casing to provide an annular resonance damping chamber communicating with the casing inlet,
(c) a plurality of plates disposed in the annular chamber forming a series of angularly spaced expansion pockets therein,
(d) a perforated cyclone mantle disposed in the casing to provide an expansion chamber communicating at one end with the annular chamber and being tapered toward its other end that is closed by the casing end wall,
(e) sound absorbing material encircling the mantle,
(f) and a tubular member disposed in spaced relationship in the mantle to provide another expansion chamber, the tubular member having one end spaced from the casing end wall for receiving fluid and its other end extending through the annular wall means for discharging such fluid.

7. A silencer in accordance with claim 6, and:
(a) a pipe to receive pressure fluid connected to said casing and communicating with the inlet, said pipe being of rectangular cross-section at the end connected to the casing and graduating to a circular cross-section at its other end to provide a first expansion chamber.

8. A silencer in accordance with claim 6, and:
(a) a cap supported at the inlet end of said casing spaced from the end of the tubular member to form with such tubular member end an annular opening for discharge of fluid.

References Cited in the file of this patent

UNITED STATES PATENTS

| | | |
|---|---|---|
| 2,057,304 | Saint-Jacques | Oct. 13, 1936 |

FOREIGN PATENTS

| | | |
|---|---|---|
| 97,758 | Sweden | Jan. 2, 1940 |
| 573,342 | Great Britain | Nov. 16, 1945 |
| 802,205 | Germany | Feb. 5, 1951 |